(12) United States Patent
Zaiss

(10) Patent No.: US 6,503,047 B2
(45) Date of Patent: *Jan. 7, 2003

(54) DEVICE FOR HOLDING-DISK-SHAPED PLASTIC SUBSTRATES

(75) Inventor: Roland Zaiss, Fremont, CA (US)

(73) Assignee: Fairchild Technologies Optical Disc Equipment Group GmbH, Vaihingen/Enz (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/352,613

(22) Filed: Jul. 13, 1999

(65) Prior Publication Data

US 2002/0037213 A1 Mar. 28, 2002

(30) Foreign Application Priority Data

Jul. 16, 1998 (DE) .......................... 298 12 696

(51) Int. Cl.⁷ .................. B65G 47/86; B65G 47/91; B65G 49/07
(52) U.S. Cl. .................. 414/737; 414/736; 294/64.1
(58) Field of Search .................. 414/729, 731, 414/732, 736, 737; 294/64.1, 65.5, 901, 902

(56) References Cited

U.S. PATENT DOCUMENTS

| | | | | | |
|---|---|---|---|---|---|
| 4,498,165 | A | * | 2/1985 | Wilkinson | .......... 369/270 |
| 5,135,376 | A | * | 8/1992 | Watanabe et al. | .... 414/737 X |
| 5,629,044 | A | * | 5/1997 | Rubenchik | .......... 427/240 |
| 5,882,171 | A | * | 3/1999 | Tinner et al. | .... 294/65.5 X |
| 6,015,175 | A | * | 1/2000 | Carruth et al. | .... 294/65.5 X |

* cited by examiner

Primary Examiner—Robert P. Olszewski
Assistant Examiner—Gerald J. O'Connor
(74) Attorney, Agent, or Firm—Jones, Tullar & Cooper, P.C.

(57) ABSTRACT

The present invention relates to a device for holding disk-shaped plastic substrates for pick-up and deposit. The device includes a holding device having at least one support unit for the plastic substrates, and a pick-up and/or deposit device on which a plastic substrate is mounted and from which the plastic substrate is picked-up or deposited. The holding device has a recess and the disk-shaped base body has a cylindrical protrusion on its side facing the holding device, which can be plugged into and releasably held mechanically or in a permanent-magnetic way in the recess.

10 Claims, 2 Drawing Sheets

DEVICE FOR HOLDING-DISK-SHAPED PLASTIC SUBSTRATES

FIELD OF THE INVENTION

The present invention relates to a device for holding preferably disk-shaped plastic substrates, such as CDs, DVDs and recording media of this type, so that they can be picked up and deposited, having a holding device on which at least one support unit for the plastic substrate is held, and a pickup and/or deposit device, from which the plastic substrate can be picked up, or respectively on which it can be deposited.

BACKGROUND OF THE INVENTION

With such a device employed in the course of processing disk-shaped plastic substrates, the support unit has a plate-shaped mask, from whose underside a pin projects, on whose circumference at least one pair of resiliently seated locking spheres are arranged opposite each other. The distance of these spheres from the underside of the mask is equal to or greater than the thickness of the plastic substrates to be processed. With this known device the pin of the support unit is inserted into the centered hole of the plastic substrate, so that the plastic substrate can snap behind the resiliently seated spheres. During transport of the plastic substrate from a pickup station to a transfer station, the plate-shaped mask holding the plastic substrate is held, with the plastic substrate downwardly suspended, with the aid of an electromagnet arranged on a transport arm which is pivotable in the horizontal plane. At the transfer station to a processing device, the plastic substrate provided with the plate-shaped mask is taken over by a vacuum holding device after the electromagnet is switched off. The removal of the plastic substrate from the plate-shaped mask, which in turn is held by an electromagnet, takes place by pulling it off by means of the vacuum. Since this known device requires electromagnets at the support arm and resiliently seated locking spheres at the plate-shaped mask, this device is relatively elaborate in design and therefore only suited for those transport devices which, like the above mentioned pivot arm, only offer two transport spaces.

SUMMARY OF THE INVENTION

It is an object of the present invention to provide a device for holding preferably disk-shaped plastic substrates of the type mentioned at the outset, which can be picked up and deposited, is designed in a simpler way and is suitable in particular for those transport devices, which are equipped with several transport spaces and move the plastic substrates in a plane which is different from the horizontal plane.

This object is attained by provision of a device for holding preferably disk-shaped plastic substrates of the type mentioned at the outset, which can be picked up and deposited. The device having a support unit with a disk-shaped base body which has on its side facing a holding device a cylindrical protrusion on which a disk-shaped plastic substrate can be placed and which can be plugged into or releasably held mechanically or in a permanent-magnetic way in a recess of the holding device.

By means of the steps in accordance with the present invention it is achieved that the disk-shaped plastic substrates can be held in a considerably simpler way and independently of the spatial position of the holding device. In this way holding of the plastic substrates, together with holding of the support unit on the holding device, is achieved without any further steps. It is assured here that when the plastic substrate is received by the support unit, the plastic substrate is unstressed and therefore not placed under a load. The steps in accordance with the present invention are advantageous in particular in connection with transport devices used for cooling the plastic substrates, which had previously been produced by means of an injection molding process. In this case a plurality of transport spaces are provided, which have been designed in a simple manner as pluggable and releasable held pickups, wherein it is not necessary to supply these transport spaces, which are equipped with a holding device, with either electrical energy or with a vacuum or the like. This makes the holding of the plastic substrates structurally particularly simple. Moreover, it is assured that the plastic substrate itself remains unstressed and is therefore not placed under a load, not only when being picked up by the holding device, but also when the plastic substrate is being pulled off the holding device, or respectively is deposited on the deposit device.

The pluggable and releasable holding of the support unit at the holding device can be provided by mechanical locking means, for example. However, in a preferred embodiment of the present invention, the support unit can be pulled out of the holding device by means of a vacuum device arranged in the pickup and/or deposit device. This arrangement provides for permanent-magnetic holding. In this case, an advantageous structural design results from the characteristics whereby a permanent-magnetic disk is arranged in the recess of the holding device, and the support unit is at least partially made of a magnetic metal, with the support unit having an axial through-bore which receives a metal bolt.

By means of the characteristic whereby the disk-shaped base body of the support unit is provided with a second cylinder protrusion which enters with play into the depression of the pickup and/or deposit device ina centering manner it is achieved that the vacuum required for pulling the plastic substrate off the holding device can be applied to the underside of the base body of the support unit without any further connecting bores. By means of this step it is also achieved that no direct stress is applied to the plastic substrate when removing it from the holding device, because the plastic substrate is not held by the vacuum, but by the support unit, and is separated from the holding device.

With the disk-shaped base body of the support unit inserted into a depression of the pickup and/or deposit device flush with the surface are provided, the plastic substrate does not only rest on the base body of the support unit, but also directly on the pickup and/or deposit device.

With the pickup and/or deposit device moved toward the holding device, the pickup and/or deposit device is moved toward the holding device for picking up, or respectively depositing the plastic substrate. In this connection it is practical to provide the pickup and/or deposit device with a support for receiving the disk-shaped base body and the disk-shaped plastic substrate, and a pressure plate which is connected with a lift drive, the pressure plate being kept at a distance from the support by a compression spring in order to limit a force possibly acting on the holding device to a minimum.

The characteristics of a holding device constituted by a rotating unit provided with several radial arms and a horizontally rotating shaft, and a support unit received on each arm are provided for the use of the device, in particular in connection with one for cooling disk-shaped plastic substrates directly after they have been injection molded, so that the plastic substrates can be cooled in the course of a complete revolution of the rotating unit in the exemplary embodiment. Moreover, an arrangement which saves space in the horizontal plane results from this, which furthermore results in improved cooling, while preventing a heat accumulation. It is practical here in accordance with the characteristic whereby a pickup station and a deposit station, which preferably follows after a full revolution in the direction of rotation are assigned to the rotating unit to provide the pickup and the deposit devices at two separate stations.

Further details of the present invention can be found in the subsequent description, in which the invention will be described in greater detail and explained by means of the exemplary embodiment represented in the drawings.

DESCRIPTION OF THE PREFERRED EMBODIMENTS

Figure 1:
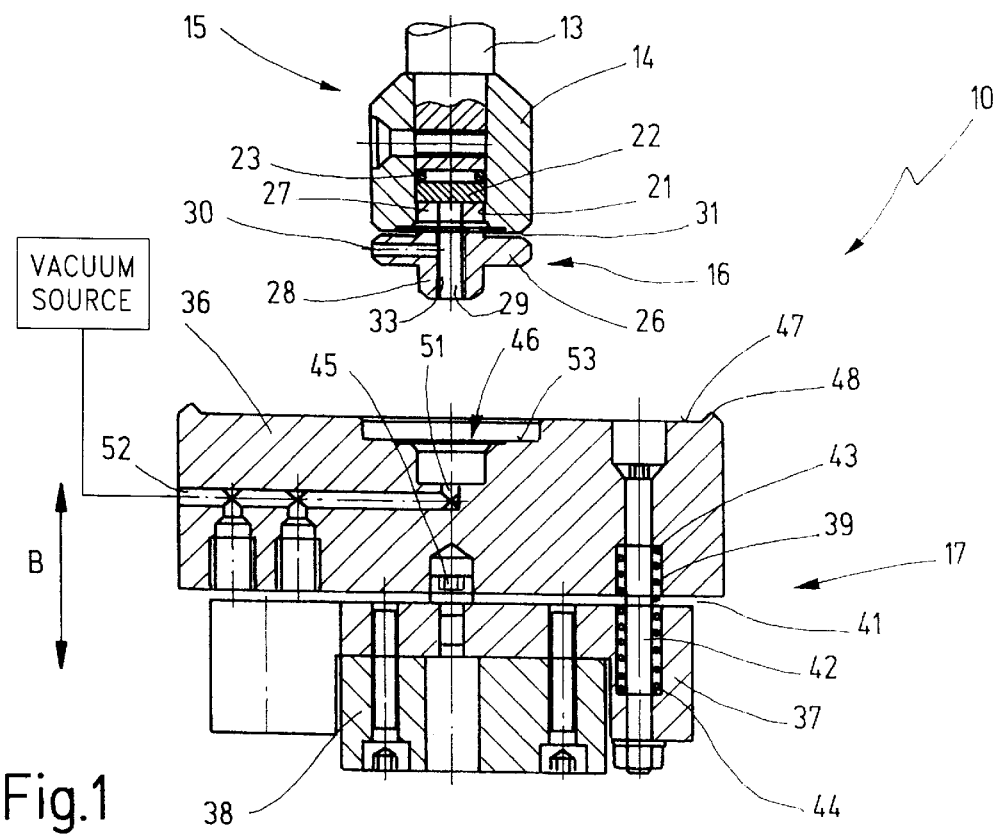
FIG. 1 represents, in a schematically cut and sectional view, a device in accordance with a preferred embodiment of the present invention for holding disk-shaped plastic substrates, which can be picked up and deposited, in an initial position.

The device 10 represented in the drawings is used for holding disk-shaped plastic substrates 11, such as CDs, DVDs and recording media of this type, which can be picked up and deposited, wherein the device 10 is of particular advantage when it is used for cooling of such disk-shaped plastic substrates 11, which had previously been produced by means of an injection molding method.

Figure 3:
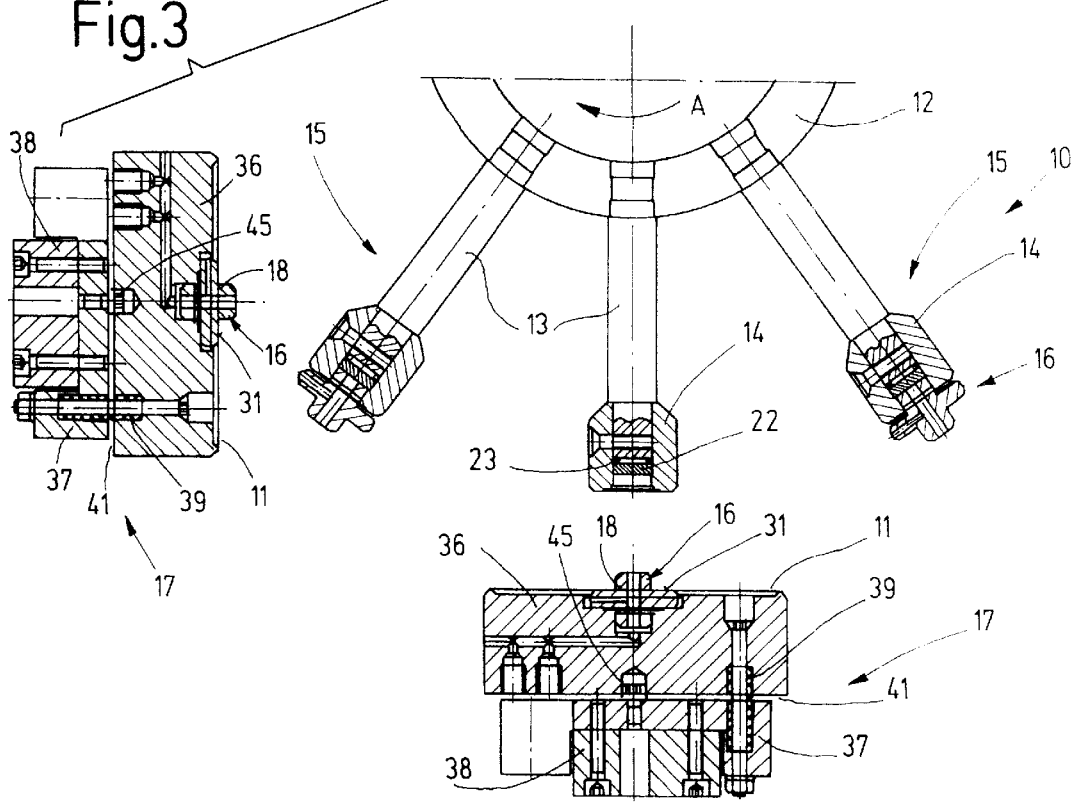
FIG. 3 shows the device in accordance with FIGS. 1 and 2 in a reduced and expanded representation, but in a position for picking up a plastic substrate.
Figure 4:
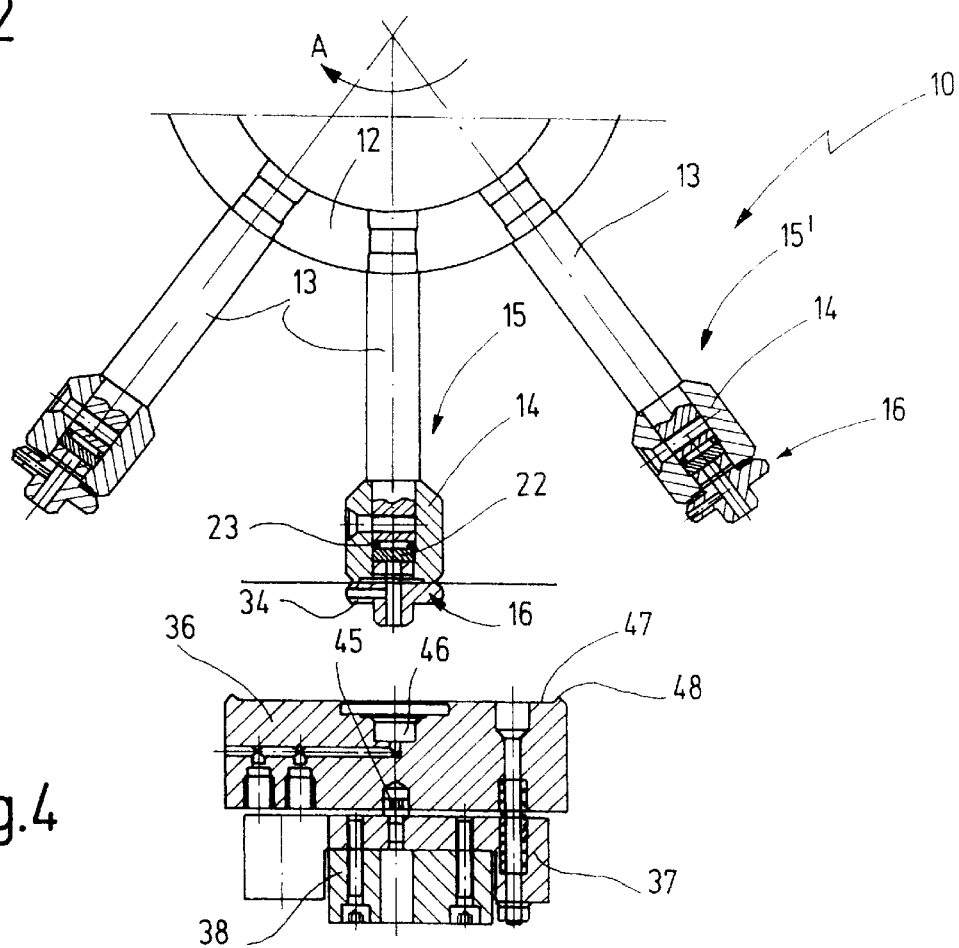
FIG. 4 is a representation corresponding to FIG. 3 with the plastic substrate picked up.

In accordance with FIGS. 3 and 4, the device 10 has a hub 12, rotatingly driven, for example in the direction of the arrow A, which is provided with a horizontal axis of rotation, on which radially projecting holding devices 15 are maintained, each of which has a spoke, or respectively an arm 13 and a pickup head 14 fastened on the end thereof. The arms 13 are arranged at identical angular distances from each other over the circumference of the hub 12. Each pickup head 14 can be releasably equipped with a support unit 16 for a disk-shaped plastic substrate 11. To this end the pickup head 14 fastened on the arm 13 has a permanent magnet 22, which is axially maintained in an axial recess 21 and supported on an O-ring 23 at the rear.

The device 10 furthermore has a pickup device 17 for picking up a disk-shaped plastic substrate 11 by means of a pickup head 14 of the holding device 15. The pickup device 17 can be moved up and down in accordance with the two-headed arrow B in relation to the respective holding device 15. As will be explained later, the pickup device 17 is used as a station for the sequential pickup of a disk-shaped plastic substrate by means of the holding devices 15 of the device 10, which rotate past this station. A further station is used for the sequential deposition of the disk-shaped plastic substrates 11, which have been cooled in the course of a complete or partial circulation. In the exemplary embodiment, the pickup station and the deposit station are identical.

The support unit 16 has a disk-shaped base body 26, which is equipped with two coaxially cylindrical protrusions 27 and 28, which are oriented toward each other and here have the same diameter and the same length. The support unit 16 has an axial threaded through-bore 29, into which an externally threaded bolt 33 has been inserted as iron core and which is fixed in place by a radial grub screw screwed into a radial threaded bore 30. The dynamically balanced support unit 16 can be used in both of its 180° positions.

The pickup device 17 essentially consists of a support body 36, a pressure plate 37 and a clamping block 38. A piston-cylinder unit, which for example is pneumatic and performs a movement in accordance with the two-headed arrow B, acts in a manner not represented on the clamping block 38, which is fixedly connected with the pressure plate 37. The pressure plate 37 is held, movable in a resilient manner, a short distance from the underside of the support body 36 by means of several compression springs 39. The spring travel 41 between the pressure plate 37 and the support body 36 resulting from this has a length of a few millimeters, for example 2 mm. The compression springs 39 enclose a bolt connection 42 and are supported via adjusting washers 40 at the shoulders 43 and 44 of the respective bores. Centering between the pressure plate 37 and the support body 36 is provided by means of a centering screw arrangement 45.

Figure 2:
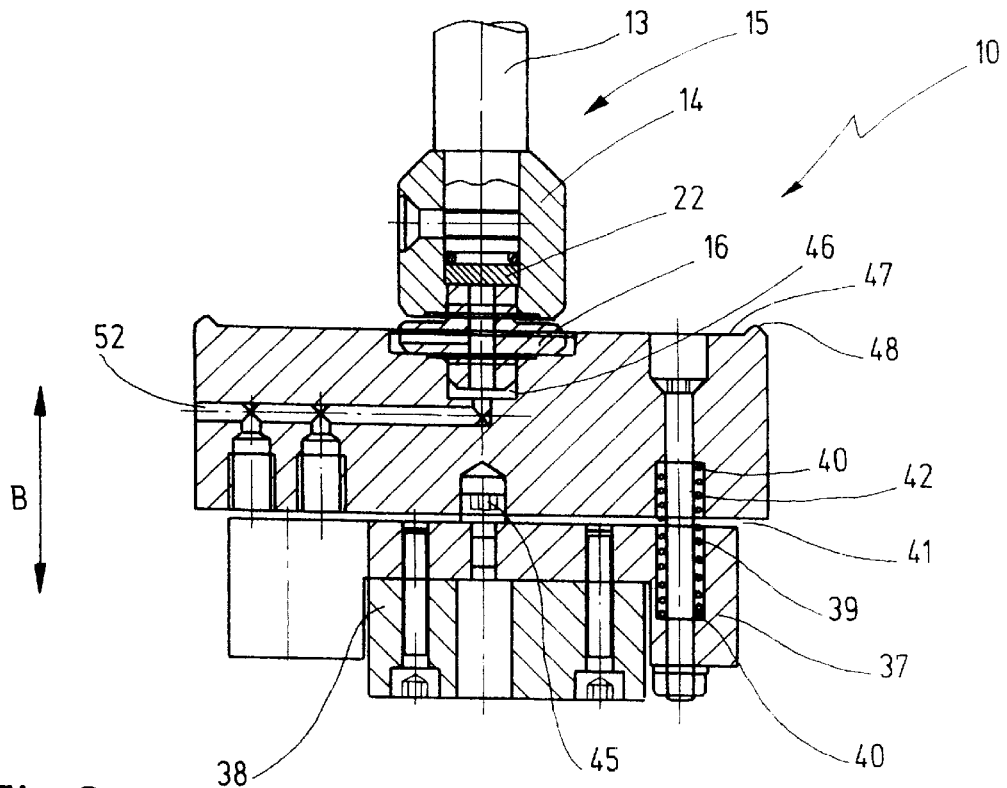
FIG. 2 shows a representation corresponding to FIG. 1, but in a transfer position.

On its upper side facing away from the pressure plate 37, the support body 36 has a centered pickup bore 46, which is provided with stepped coaxial elements and into which the cylindrical protrusion 28, or respectively the disk-shaped base body 26 fits. The pickup bore 46 starts at a depression 47 of larger diameter, which is bordered at the circumferential edge by a circularly-shaped support 48 for the disk-shaped plastic substrate 11. In the inserted position in accordance with FIG. 2, the support surface of the circularly-shaped support 48 is co-planar with the upper support surface 31 of the disk-shaped base body 26. At its inner end, the pickup bore 46 is provided with a connecting bore 51, which terminates in one or several radial bores 52, which is/are connected in a manner not shown with a vacuum device. In the position of the support unit 16 represented in FIG. 2, the underside 34 of the disk-shaped base body 26 rests on an annular shoulder 53 of the first bore element of the pickup bore 46. The bore element connected with this receives the lower cylindrical protrusions 28 with radial play (for example 0.5 mm). A depression exists between the annular shoulder 53 and the pickup bore 46, through which, a well as through the radial play, the vacuum from the bores 52 and 51 can be applied to a free annular face (vacuum application face) on the underside 34 of the support unit 16.

In accordance with FIG. 1, a support unit 16 in the pickup head 14 is releasably held in a permanent-magnetic manner by the permanent magnet 22 and by the iron core 33 in an initial position. In this position the support surface 31 of the disk-shaped base body 26 of the support unit 16 is at a distance from the underside of the pickup head 14, which approxinately corresponds to the thickness of the substrate 11. In order to reach the transfer position represented in FIG. 2, the pickup device 17 is moved upward in accordance with the two-headed arrow B in such a way that the support unit 16 is received in the pickup bore 46 of the support body 36. In this position a vacuum is applied to the underside 34 of the support unit 16, so that the support unit 16 is separated in this way from the permanent magnet 22 and therefore is held in the pickup bore 46 of the support body 36, or respectively remains in it. The pickup device 17 is again moved axially downward while the vacuum is applied.

Thereafter, a substrate 11, provided with a center hole 18, is placed on the support body 36 by means of a feed device, not represented, as can be seen in FIG. 3. The plastic substrate, produced in a process not represented, lies on the disk-shaped base body 26 and the circularly-shaped support 48 and is radially held by the cylindrical protrusion 27, whose exterior diameter approximately corresponds to the interior diameter of the hole 18.

Following this, the support unit 16 connected with the substrate 11 can again be moved to the holding device 15 by lifting the pickup device 17, since without a vacuum the support unit 16 remains suspended from the permanent magnet 22. The pickup device 17 is then moved downward again, and this operational position is represented in FIG. 4.

A cushioned adhesion is achieved by means of the resilient connection between the clamping block 38, or respectively the pressure plate 37, and the support body 36 during the movement of the pickup device 17 upward towards the pickup head 14, and therefore a minimum force action is applied to the support unit 16 and the pickup head 14, or respectively to the entire holding device 15.

Following the pickup of a substrate 11 in accordance with FIG. 4, the hub 12 is moved on by one step in accordance with the arrow A, so that a substrate 11 can be picked up in the just described manner by the subsequent holding device 15'. The step-by-step rotating movement of the substrates 11 allows, for example, cooling of the substrates 11, wherein the length of cooling depends on the location of the following deposit station. For example, the deposition of the cooled substrates 11 can take place after one complete or almost complete revolution. The substrates cooled in this way are then moved away for further processing.

What is claimed is:

1. A device for holding disk-shaped plastic substrates for pick-up and deposit, comprising:
    a holding device having at least one support unit for the plastic substrates; and
    a pickup and/or deposit device on which a plastic substrate is mounted and from which the plastic substrate is picked-up or deposited,
    wherein said holding device has a recess, said support unit has a disk-shaped base body having a cylindrical protrusion on its side facing said holding device, which can be plugged into and releasably held mechanically or in a permanent-magnetic way in said recess, and wherein the disk-shaped plastic substrate is placed on said cylindrical protrusion, wherein said pickup and/or deposit device includes a vacuum source, and wherein said support unit can be pulled out of said holding device by means of said vacuum source.

2. The device as defined in claim 1, further comprising:
    a permanent-magnetic disk arranged in said recess, and wherein said support unit is at least partially made of a magnetic metal.

3. The device as defined in claim 1, wherein said support unit has an axial through-bore which receives a metal bolt.

4. The device as defined in claim 1, wherein said pickup and/or deposit device includes a depression, and wherein said disk-shaped base body is provided with a second cylindrical protrusion, which enters, with play, into said depression in a centering manner.

5. The device as defined in claim 4, wherein said disk-shaped base body can be inserted into said depression flush with the surface of said depression.

6. The device as defined in claim 1, wherein said pickup and/or deposit device is movable toward said holding device.

7. The device as defined in claim 1, further comprising:
    a lift drive; and
    compression spring means,
    wherein said pickup and/or deposit device has a support receiving said disk-shaped base body and the disk-shaped plastic substrate, and a pressure plate connected with said lift drive, and wherein said pressure plate is kept at a distance from said support by said compression spring means.

8. The device as defined in claim 1, wherein said holding device comprises a rotating unit provided with a plurality of radial arms and a horizontal, rotating shaft, and wherein a plurality of support units are provided, one for each arm.

9. The device as defined in claim 8, wherein a pickup device and a deposit device are arranged spaced apart in the direction of rotation of said rotating unit, said pickup device and said deposit device forming a pickup station and a deposit station, respectively.

10. A device for holding disk-shaped plastic substrates for pick-up and deposit, comprising:
    A holding device for the plastic substrates, said holding device having a rotatable hub and at least one support unit for the plastic substrates extending from said rotatable hub;
    a pickup device on which a plastic substrate is mounted and from which the plastic substrate is picked-up by said at least one support unit; and
    a deposit device on which a plastic substrate is deposited by said at least one support unit,
    wherein said pickup device and said deposit device are spaced apart in the direction of rotation of said rotatable hub, said at least one support unit includes magnetic means adapted to hold the plastic substrate while said rotatable hub rotates from said pickup device to said deposit device, said pickup device and said deposit device are movable toward and away from said at least one support unit, and said pickup device and said deposit device each include a vacuum source which serves to permit said at least one support unit to be pulled out of said pickup device and said deposit device.

* * * * *